US012694570B2

(12) United States Patent
Pietarinen

(10) Patent No.: US 12,694,570 B2
(45) Date of Patent: Jul. 28, 2026

(54) DIVIDING AN ASTC TEXTURE TO A SET OF SUB-IMAGES

(71) Applicant: Jeppesen ForeFlight, Inc., Englewood, CO (US)

(72) Inventor: Seppo A. Pietarinen, Helsinki (FI)

(73) Assignee: Jeppesen ForeFlight, Inc., Englewood, CO (US)

( * ) Notice: Subject to any disclaimer, the term of this patent is extended or adjusted under 35 U.S.C. 154(b) by 664 days.

(21) Appl. No.: 17/720,252

(22) Filed: Apr. 13, 2022

(65) Prior Publication Data

US 2022/0343544 A1 Oct. 27, 2022

Related U.S. Application Data

(60) Provisional application No. 63/180,034, filed on Apr. 26, 2021.

(51) Int. Cl.
*G06T 9/00* (2006.01)
*G06F 16/174* (2019.01)
*G06T 1/00* (2006.01)

(52) U.S. Cl.
CPC ............ *G06T 9/00* (2013.01); *G06F 16/1744* (2019.01); *G06T 1/0007* (2013.01); *G06T 2200/24* (2013.01); *G06T 2210/32* (2013.01)

(58) Field of Classification Search
CPC .............. G06F 16/1744; H04N 19/119; H04N 19/176; H04N 19/174; H04N 19/34
See application file for complete search history.

(56) References Cited

U.S. PATENT DOCUMENTS

| | | | |
|---|---|---|---|
| 2009/0153701 A1 | 6/2009 | Koutaki et al. | |
| 2009/0226088 A1* | 9/2009 | Okazawa ............. | G11B 27/034 |
| | | | 382/173 |
| 2014/0331018 A1* | 11/2014 | Gerphagnon ........... | G06F 11/00 |
| | | | 711/162 |
| 2016/0118078 A1* | 4/2016 | Huetter ............ | G06K 19/06046 |
| | | | 369/275.3 |
| 2016/0353122 A1* | 12/2016 | Krajcevski .......... | H03M 7/3084 |
| 2020/0272396 A1* | 8/2020 | Tsugimura ......... | G06K 15/1865 |

FOREIGN PATENT DOCUMENTS

EP        3468185 A1        4/2019

OTHER PUBLICATIONS

Office Action in corresponding European Application No. 22169609.9 issued Oct. 6, 2022 (12 pages).

(Continued)

*Primary Examiner* — Peter K Huntsinger
(74) *Attorney, Agent, or Firm* — Lathrop GPM LLP

(57) ABSTRACT

A method including encoding a digital image file into an adaptable scalable texture compression (ASTC) file comprising a single file. The method also includes dividing, logically, the ASTC file into a sub-image comprising a sub-portion of the ASTC file. The method also includes copying the sub-image to a computer memory. The method also includes associating an ASTC header with the sub-image in the computer memory. The method also includes storing a combination of the ASTC header and the sub-image in the computer memory as a new ASTC file.

20 Claims, 8 Drawing Sheets

(56) References Cited

OTHER PUBLICATIONS

Nystad J. et al., "Adaptive Scalable Texture Compression"; Proceedings of the fourth ACM Siggraph/Eurographics Conference on High-Performance Graphics; Jun. 25, 2012, pp. 105-114 (10 pages).
Krajcevski P. et al., "VBTC: GPU-Friendly Variable Block Size Texture Encoding"; Computer Graphics Forum: Journal of the European Association for Computer Graphics, Wiley-Blackwell, Oxford; vol. 35 No. 2, May 27, 2016, pp. 409-418 (10 pages).
Www.windy.com, https://www.windy.com/37.322/-120.607?aod550,37.306-120.584, 18, Apr. 21, 2021, 1 page.

* cited by examiner

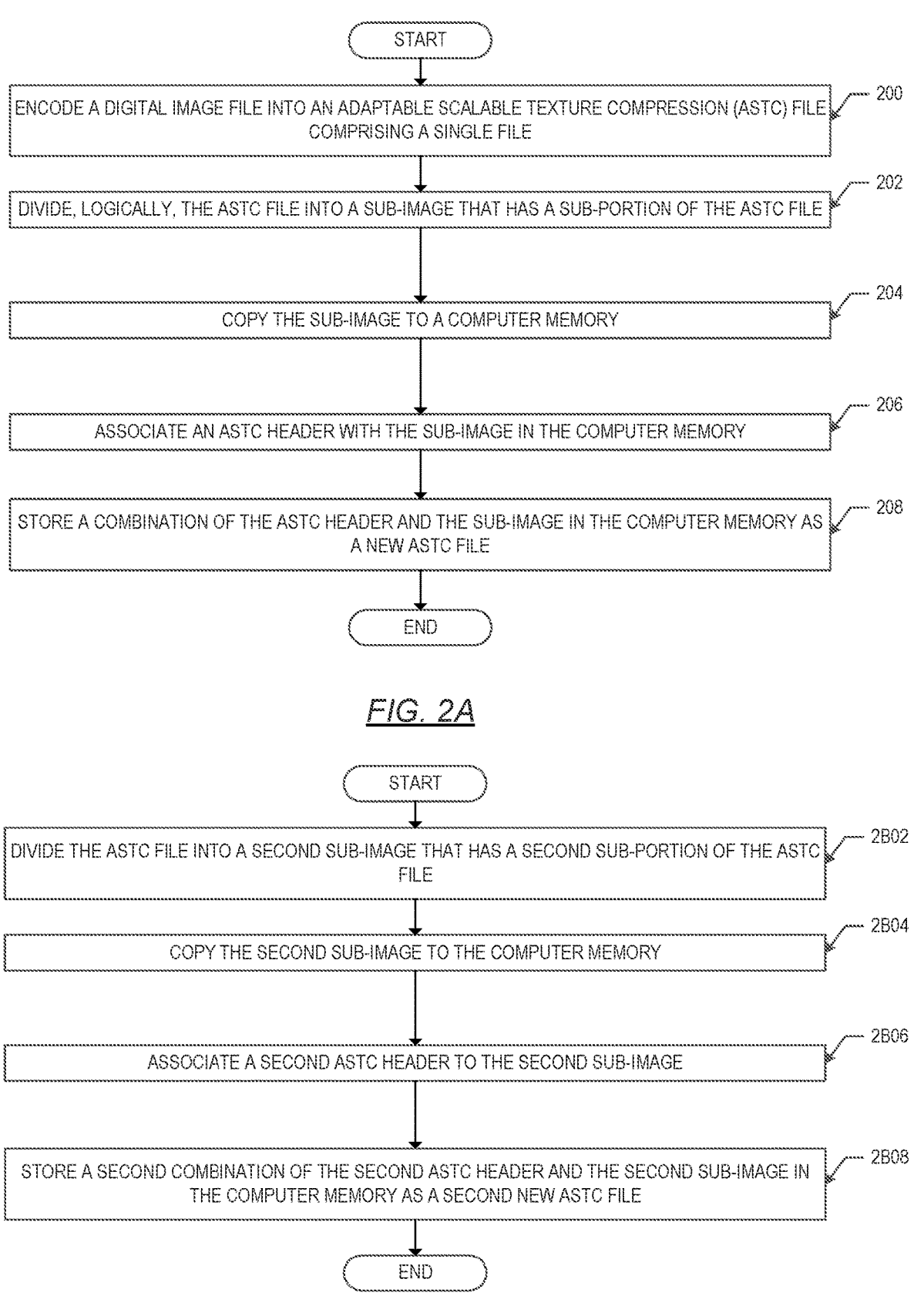

START

ENCODE A DIGITAL IMAGE FILE INTO AN ADAPTABLE SCALABLE TEXTURE COMPRESSION (ASTC) FILE COMPRISING A SINGLE FILE — 200

DIVIDE, LOGICALLY, THE ASTC FILE INTO A SUB-IMAGE THAT HAS A SUB-PORTION OF THE ASTC FILE — 202

COPY THE SUB-IMAGE TO A COMPUTER MEMORY — 204

ASSOCIATE AN ASTC HEADER WITH THE SUB-IMAGE IN THE COMPUTER MEMORY — 206

STORE A COMBINATION OF THE ASTC HEADER AND THE SUB-IMAGE IN THE COMPUTER MEMORY AS A NEW ASTC FILE — 208

END

*FIG. 2A*

START

DIVIDE THE ASTC FILE INTO A SECOND SUB-IMAGE THAT HAS A SECOND SUB-PORTION OF THE ASTC FILE — 2B02

COPY THE SECOND SUB-IMAGE TO THE COMPUTER MEMORY — 2B04

ASSOCIATE A SECOND ASTC HEADER TO THE SECOND SUB-IMAGE — 2B06

STORE A SECOND COMBINATION OF THE SECOND ASTC HEADER AND THE SECOND SUB-IMAGE IN THE COMPUTER MEMORY AS A SECOND NEW ASTC FILE — 2B08

END

*FIG. 2B*

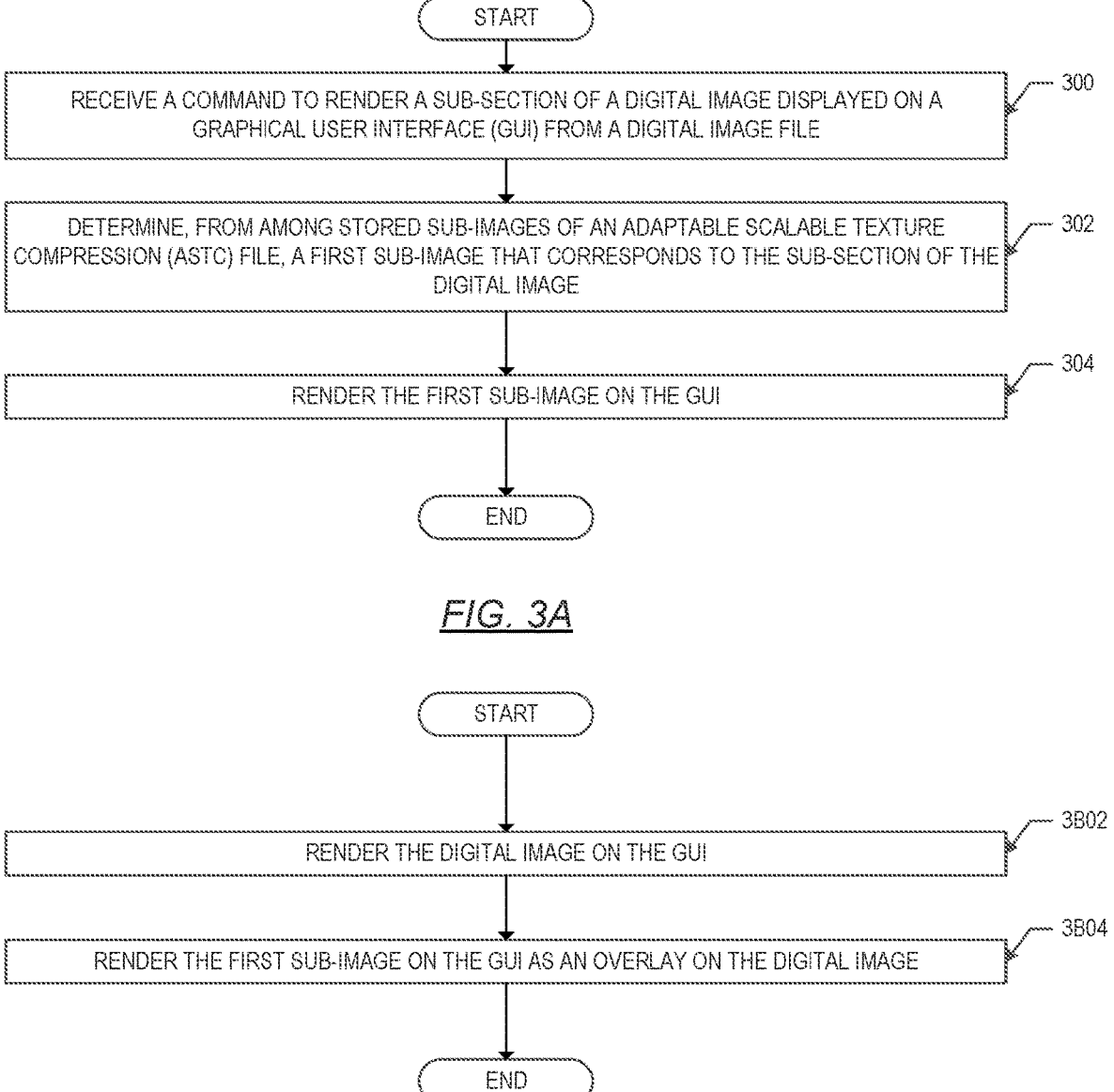

START

RECEIVE A COMMAND TO RENDER A SUB-SECTION OF A DIGITAL IMAGE DISPLAYED ON A
GRAPHICAL USER INTERFACE (GUI) FROM A DIGITAL IMAGE FILE — 300

DETERMINE, FROM AMONG STORED SUB-IMAGES OF AN ADAPTABLE SCALABLE TEXTURE
COMPRESSION (ASTC) FILE, A FIRST SUB-IMAGE THAT CORRESPONDS TO THE SUB-SECTION OF THE
DIGITAL IMAGE — 302

RENDER THE FIRST SUB-IMAGE ON THE GUI — 304

END

*FIG. 3A*

START

RENDER THE DIGITAL IMAGE ON THE GUI — 3B02

RENDER THE FIRST SUB-IMAGE ON THE GUI AS AN OVERLAY ON THE DIGITAL IMAGE — 3B04

END

*FIG. 3B*

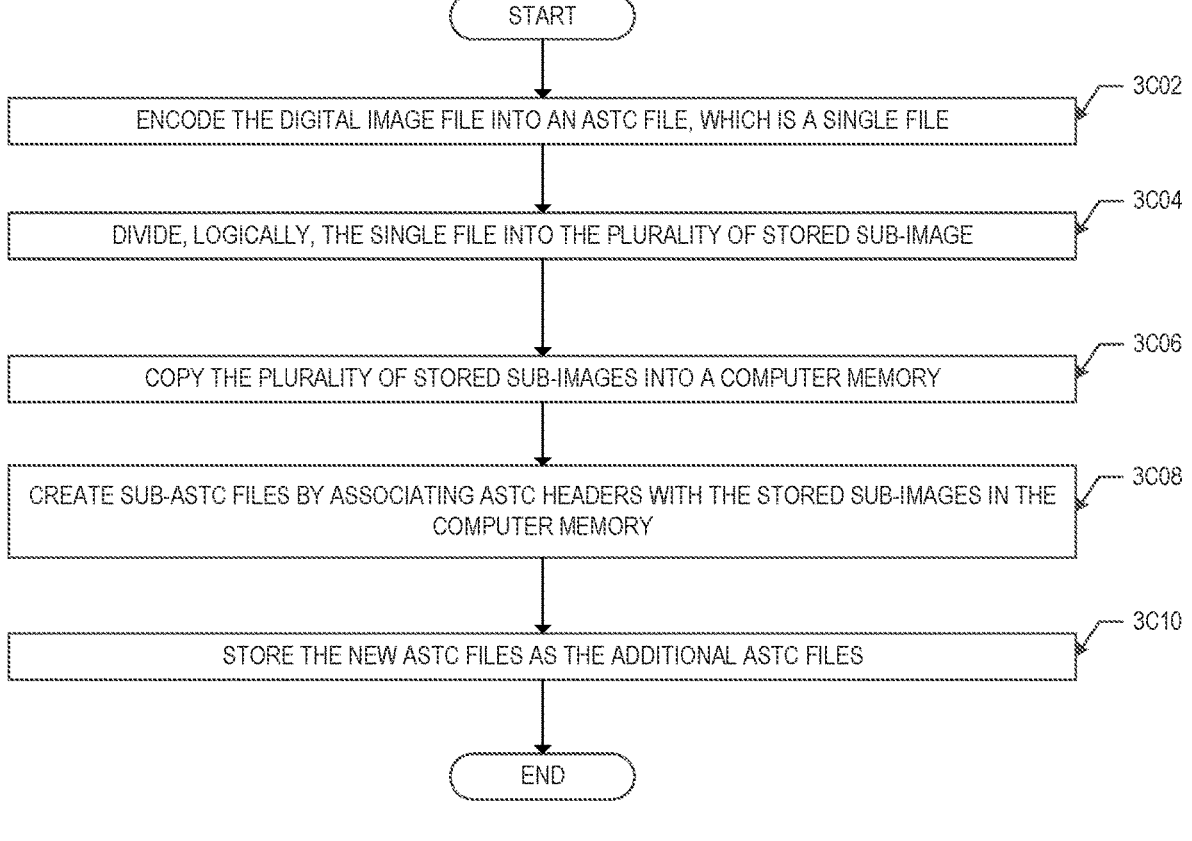

START

ENCODE THE DIGITAL IMAGE FILE INTO AN ASTC FILE, WHICH IS A SINGLE FILE — 3C02

DIVIDE, LOGICALLY, THE SINGLE FILE INTO THE PLURALITY OF STORED SUB-IMAGE — 3C04

COPY THE PLURALITY OF STORED SUB-IMAGES INTO A COMPUTER MEMORY — 3C06

CREATE SUB-ASTC FILES BY ASSOCIATING ASTC HEADERS WITH THE STORED SUB-IMAGES IN THE COMPUTER MEMORY — 3C08

STORE THE NEW ASTC FILES AS THE ADDITIONAL ASTC FILES — 3C10

END

FIG. 3C

DIVIDING AN ASTC TEXTURE TO A SET OF SUB-IMAGES

RELATED APPLICATIONS

This application claims priority to U.S. Provisional Patent Application No. 63/180,034, filed Apr. 26, 2021, the contents of which are hereby incorporated by reference in their entirety.

BACKGROUND

Digital images are often compressed in order to reduce the memory required to store the digital image, and in some cases to reduce the processing resources used to process the digital image. Many different types of digital image compression techniques exist.

SUMMARY

The one or more embodiments provide for a method. The method includes encoding a digital image file into an adaptable scalable texture compression (ASTC) file is a single file. The method also includes dividing, logically, the ASTC file into a sub-image including a sub-portion of the ASTC file. The method also includes copying the sub-image to a computer memory. The method also includes associating an ASTC header with the sub-image in the computer memory. The method also includes storing a combination of the ASTC header and the sub-image in the computer memory as a new ASTC file.

The one or more embodiments also provide for another method. The method includes receiving a command to render a sub-section of a digital image displayed on a graphical user interface (GUI) from a digital image file. The method also includes determining, from among stored sub-images of an adaptable scalable texture compression (ASTC) file, a first sub-image that corresponds to the sub-section of the digital image. The ASTC file is a single file encoded from the digital image file. The stored sub-images are stored as additional ASTC files. The method also includes rendering the first sub-image on the GUI.

The one or more embodiments also provide for a system. The system includes a computer including a central processing unit (CPU), a graphics processing unit (GPU) in communication with the CPU, a non-transitory computer readable storage medium in communication with the CPU, a memory in communication with the CPU, and a display device. The system also includes computer readable program code, stored on the non-transitory computer readable storage medium, which when executed, performs a computer-implemented method. The computer-implemented method includes receiving a command to render a sub-section of a digital image displayed on a graphical user interface (GUI) from a digital image file. The computer-implemented method also includes determining, from among stored sub-images of an adaptable scalable texture compression (ASTC) file, a first sub-image that corresponds to the sub-section of the digital image. The ASTC file is a single file encoded from the digital image file. The stored sub-images are stored as additional ASTC files. The computer-implemented method also includes rendering the first sub-image on the GUI.

Other aspects of the one or more embodiments will be apparent from the following description and the appended claims.

BRIEF DESCRIPTION OF DRAWINGS

FIG. 2A, FIG. 2B, FIG. 2C, FIG. 2D, FIG. 2E, and FIG. 2F are flowcharts of methods for encoding a digital image file into an ASTC format, in accordance with one or more embodiments.

FIG. 3A, FIG. 3B, and FIG. 3C are flowcharts of methods for rendering a digital image file, in accordance with one or more embodiments.

DETAILED DESCRIPTION

Figure 1:
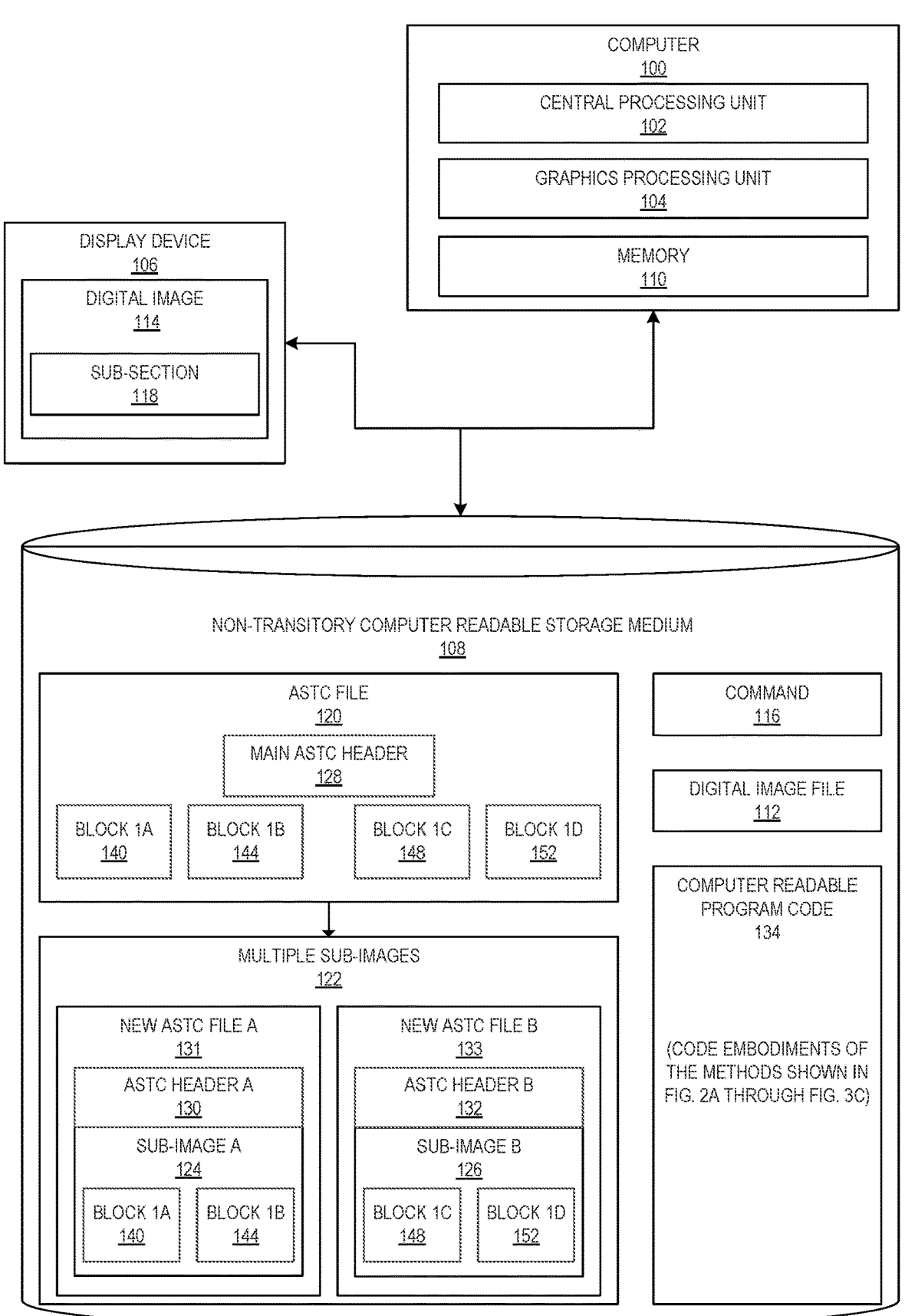
FIG. 1 shows a computing system, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, a "texture" is defined as a data object (such as, but not limited to, an OPENGL® object) that contains one or more images that have a given image format. As used herein, an ASTC texture is defined as a particular type of texture having the properties of the ASTC definition.

For example, an ASTC texture is a form of texture compression that can be encoded using various block sizes. The term "ASTC" stands for "adaptable scalable texture compression".

In general, the one or more embodiments relate to techniques for compressing and/or rendering digital image files. Compressing a bitmap to a compressed ASTC format is a time consuming task. Traditionally, for example starting with a JPEG ("Joint Photographic Experts Group") file format, a large bitmap is first decoded to memory and divided into sub-tiles that are then subsequently compressed to the desired format. (If the input textures of the one or more embodiments happened to be ASTC files, the input textures can be divided into sub-images without any additional processing, thus saving both computational cycles and memory.)

Not all file formats or compression types are suitable for all computing applications. For example, it is often required, when using sub-images to represent terrain, weather or similar raster data, to have the left and right pixel columns along with top and bottom pixel rows to be exactly equal. This requirement is impossible or impracticable to achieve if a traditionally lossy compression method, such as JPEG, is used to re-encode the individual sub-images.

In particular, lossy compression methods such as JPEG employ knowledge about the entire structure of the image. As a result, it is impossible to subdivide a large JPEG bitmap after the large bitmap has been encoded, without decoding first and then re-encoding after the subdivision. Even if the re-encoding process is used, a lossy compression method such as JPEG can lead to potential degradation of image quality.

If the entire bitmap is stored in memory, subdividing the bitmap to sub-images in the memory would involve at least three steps. The first step is to copy the memory portion representing each sub-image to a corresponding continuous block of memory. The second step is to encode a given block of memory into another lossless compression representation (such as, but not limited to, a PNG ("Portable Network Graphics" format) that can be consumed by the ASTC ("Adaptable Scalable Texture Compression") encoder. The third step is to encode that portion alone to an ASTC file. However, the third step causes computing overhead in terms of setting up and tearing down the ASTC encoder.

This three-step approach is time and memory consuming. Additionally, if the desired sub-image dimension is large, for example 91 pixels wide and 91 pixels tall, and the desired ASTC block size is 5×5, then a disadvantageous file compression occurs. Specifically, a memory block representing a 91×91 sub-image encoded as an ASTC file would have the right pixel column be different from the left pixel column. The different columns occur due to the lossy nature of ASTC encoding.

Other types of lossy compression methods may have similar issues. As indicated above, lossless compression methods may have other issues, such as for example being too computationally expensive to process with sufficient speed to satisfy a computer programmer wanting to render a dynamically changing image. Thus, a technical challenge exists when using a computer to render dynamically changing images with sufficient speed so as to avoid user dissatisfaction, or to avoid a rendering process that takes so much time to compute that a useable screen rendering cannot be achieved.

The one or more embodiments address these and other technical challenges by providing a method that allows encoding of the entire bitmap of an image file in one file format (such as a lossy format like JPEG or a lossless format like PNG) into ASTC format that can then be further subdivided without additional encoding. First, the entire bitmap of the source file is encoded to one large ASTC file. The subdivision to individual ASTC encoded sub-images is done directly in ASTC space. Specifically, entire ASTC blocks are copied to a new memory location so that the desired ASTC sub-files (representing sub-images) are obtained. An ASTC header is written at the beginning of each sub-image. In this manner, the sub-imaged ASTC file is ready to be used without any further encoding when a user desires to see a portion of a sub-image on the display device.

Stating the technical issue and approach differently, the technical issue is to render a sub-portion of a large bitmap file when using a rendering application that uses a specific file format, but where the original large bitmap file is not in the specific file format. It is not practical to encode only the sub-portion of the bitmap file into the specific file format, for the reasons given above, but primarily because individually encoding sub-portions of the bitmap upon dynamic demand can take an excessive amount of time.

The technical approach is to encode the entire bitmap file in the specific file format desired (i.e., the ASTC file format), and then sub-divide the ASTC file into smaller ASTC files. When the sub-portion of the image is to be rendered, one of the smaller ASTC files (corresponding to the sub-portion of the image) is accessed and rendered in a bitwise copy operation. The bitwise copy operation is fast and efficient from the standpoint of a computer processor. In this manner, the one or more embodiments may substantially increase the speed of the computer at rendering sub-portions of the data included in the original bitmap file, relative to the speed at which the computer could re-encode a sub-portion of the original bitmap file into ASTC format. In some cases, the one or more embodiments enable such a rendering operation where the computer could not, previously, perform the desired rendering operation, due to the computational expense of the alternative rendering methods.

Attention is now turned to the figures. FIG. 1 shows a computing system, in accordance with one or more embodiments. The system shown in FIG. 1 may be implemented using components shown in FIG. 5A and FIG. 5B.

The system shown in FIG. 1 includes a computer (100). The computer (100) includes a central processing unit (102) ("CPU") and a graphics processing unit (104) ("GPU") in communication with each other. The central processing unit (102) is a type of hardware processor responsible for general computing functions of the computer (100). The graphics processing unit (104) is a type of hardware processor responsible for computing on graphics-related calculations. Thus, for example, the central processing unit (102) may receive a command to render graphics and then pass the processing to the graphics processing unit (104). The graphics processing unit (104) returns the result to the central processing unit (102), or renders the graphics directly onto a display device (106).

The display device (106) is a hardware screen that can display a graphical user interface (GUI) and/or one or more images to a user of the computer (100). The display device (106) may be part of the computer (100), but is shown separately because the display device (106) could be a remote computer which receives rendering data from the computer (100).

The system also includes a non-transitory computer readable storage medium (108). The non-transitory computer readable storage medium (108) is a memory that stores information useable by the computer (100). The non-transitory computer readable storage medium (108) may be part of the computer (100), but also may be a remote storage facility, and thus is shown as a separate component. The non-transitory computer readable storage medium (108) stores program code (e.g., computer readable program code (134) described below) which, when executed by one or more of the central processing unit (102) and the graphics processing unit (104), performs one or more computer-implemented methods. The computer-implemented methods are described with respect to FIG. 2A through FIG. 3C, but relate generally to the method of encoding and subdividing an ASTC file, as described above.

The system also includes a memory (110). The memory (110) is, in one embodiment, a transient memory, such as random access memory ("RAM"). A transient memory temporarily holds data during processing. In some cases, the memory (110) may be replaced with a non-transitory computer readable storage medium which stores data more permanently. In other embodiments, the memory (110) can be replaced with the non-transitory computer readable storage medium (108), or vice versa.

The non-transitory computer readable storage medium (108) stores a digital image file (112). The digital image file (112) contains information that can be rendered to display a digital image (114) on the display device (106). In the one or more embodiments, the digital image file (112) is in a first file format which is not desirable for rendering only portions of the digital image file (112). For example, as described above, it may be inefficient to encode only sub-portions of the digital image file (112) into an ASTC file format during dynamic processing of changing images.

The digital image file (112) may take a number of different forms. Examples of the digital image file (112) include, but are not limited to, a bitmap image (BMP) file, a joint photographic experts group (JPEG) file, a portable network graphics (PNG) file, a tagged image file format (TIFF), a graphics interchange format (GIF) file, a digital negative format (DNG) file, an exchangeable image file format (Exif) file, a WebP file, and a high efficiency image file format (HEIF) file.

In an embodiment, the digital image file (112) may be in the ASTC file format. In this case, the separate ASTC encoding, described below, is not needed. Instead, in this case, the digital image file (112) will be subdivided as described with respect to FIG. 2A through FIG. 2F to form multiple new ASTC files, described below.

The non-transitory computer readable storage medium (108) also stores a command (116). The command (116) is a computer instruction to render a sub-section (118) of the digital image (114). The sub-section (118) may be rendered in a separate section of the display device (106), maybe overlaid the digital image (114), or may be used to replace the digital image (114). However, the sub-section (118) is less than all of the digital image (114), and is represented by less than all of the data in the digital image file (112).

The non-transitory computer readable storage medium also stores an ASTC file (120). Again, the term "ASTC" is defined as "adaptable scalable texture compression." The ASTC file (120) is, initially, a single file encoded from the digital image file (112) (for reference, the digital image file (112) is the file from which the digital image (114) is originally rendered). When the ASTC file (120) is divided according to the procedures described with respect to FIG. 2A through FIG. 2F, the result is the multiple sub-images (122), all of which may be characterized as additional ASTC files.

The ASTC file (120) includes a main ASTC header (128). The main ASTC header (128) contains information, such as metadata, that identifies the ASTC file (120) and defines various parameters that may be read when the ASTC file (120) is accessed. The main ASTC header (128) is, in part, what makes the ASTC file (120) in the ASTC format.

The ASTC file (120) also includes a number of blocks, including block 1A (140), block 1B (144), block 1C (148), and block 1D (152). A block is a segment of digital image data that can be used to render all or a portion of a sub-image. Thus, for example, one or more of block 1A (140) and block 1B (144) could be used to render the sub-section (118) on the display device (106).

Thus, in summary the ASTC file (120) is defined as the main ASTC header (128) and multiple blocks of digital image data (e.g., the block 1A (140), the block 1B (144), the block 1C (148), and the block 1D (152)). Again, the ASTC file (120) was encoded from the digital image file (112).

The ASTC file (120) is logically divided into multiple new ASTC files, including but not limited to new ASTC file A (131) and new ASTC file B (133). The process of dividing the ASTC file (120) into multiple new ASTC files is described with respect to FIG. 2A through FIG. 2F.

Briefly, the ASTC file (120) is divided into multiple sub-images (122), with each of the multiple sub-images (122) defined by the new ASTC file A (131), the new ASTC file B (133), and any another new ASTC files.

Each of the new ASTC files is defined by a header and a sub-image. Thus, the ASTC header A (130) is defined by ASTC header A (130) and sub-image A (124). In turn, the ASTC header B (132) is defined by ASTC header B (132) and sub-image B (126). The sub-images and their headers are created in the one or more embodiments as the new ASTC files, new ASTC file A (131) and new ASTC file B (133).

Each sub-image is defined by one or more blocks of image data. In this example, the sub-image A (124) is defined by block 1A (140) and block 1B (144). The sub-image B (126) is defined by block 1C (148) and block 1D (152). More or fewer blocks may be present for each sub-image.

In summary, the ASTC file (120) containing multiple blocks of image data (e.g., block 1A (140), block 1B (144), block 1C (148), and block 1D (152)) is divided into multiple new ASTC files, such as new ASTC file A (131) and new ASTC file B (133). Each new ASTC file has an ASTC header and a sub-image defined by ones of the blocks from the ASTC file (120). The blocks in the new ASTC files represent the data used to render a sub-image.

While a "block" may be described as being "associated with" a "header", unless otherwise stated the blocks do not have individual sub-headers within the sub-images. In an embodiment, it is possible to associate the individual blocks with corresponding individual headers and thereby further sub-divide the sub-images into multiple divisions of additional sub-images.

In an embodiment, the ASTC blocks have an equal size. In other words, all ASTC blocks are defined by a predetermined number of bits. A bit, in computing, is a value of either "0" or "1", which a computer can use to perform calculations.

Returning to the display device (106), the sub-section (118) rendered on the display device (106) is, in the one or more embodiments, a rendering of one or more of the new ASTC files (e.g., the new ASTC file A (131) and/or the new ASTC file B (133)). However, when rendering the one or more of the multiple sub-images (122), only a bitwise copy command is executed with respect to the sub-image in question, thereby saving extensively on computing power relative to encoding the sub-section (118) of the digital image (114) (i.e., a portion of the digital image file (112)).

The non-transitory computer readable storage medium (108) also stores computer readable program code (134). The computer readable program code (134) may be executed by the central processing unit (102) exclusively, the graphics processing unit (104) exclusively, or a combination of the central processing unit (102) and the graphics processing unit (104). The one or more embodiments contemplate that in many cases the graphics processing unit (104) will exclusively execute the computer readable program code (134). The computer readable program code (134) is computer code that embodies the algorithms described with respect to FIG. 2A through FIG. 3C.

While FIG. 1 shows a configuration of components, other configurations may be used without departing from the scope of the one or more embodiments. For example, various components may be combined to create a single component. As another example, the functionality performed by a single component may be performed by two or more components.

FIG. 2A through FIG. 3C are flowcharts, in accordance with one or more embodiments. In particular, FIG. 2A, FIG. 2B, FIG. 2C, FIG. 2D, FIG. 2E, and FIG. 2F are flowcharts of methods for encoding a digital image file into an ASTC format, in accordance with one or more embodiments. FIG. 3A through FIG. 3C are flowcharts of methods for rendering a digital image file, in accordance with one or more embodiments. The methods of FIG. 2A through FIG. 3C may be performed using the system shown in FIG. 1 and/or the components shown in FIG. 5A and FIG. 5B.

Attention is first turned to FIG. 2A. FIG. 2A may be characterized as a method for transforming a data structure from one format (e.g., the digital image file (112) of FIG. 1) into another format (e.g. the ASTC file (120) with multiple sub-images (122) of FIG. 1).

Step 200 includes encoding a digital image file into an adaptable scalable texture compression (ASTC) file. The ASTC file is a single file. Encoding may be performed by using an ASTC encoder. Several different encoder algorithms are available.

Compression formats used for textures are based on compressing specific blocks of pixels. This arrangement makes facilitates hardware distinguishing what has to be decompressed to get at a specific texel, which is a frequent operation in texture accessing.

Most compression formats have a fixed size of blocks. Compression formats such as S3TC, BPTC, and RGTC all use 4×4 pixel blocks. The byte sizes can be different based on different variations of the format. DXT1 in S3TC uses 8-byte blocks, while DXT3/5 use 16-byte blocks.

ASTC works against a large range of block sizes in terms of pixel footprints. However, the amount of space a block takes up is 16 bytes. Therefore, the number of bits per pixel that ASTC takes up is determined by the block size used. Thus, for the 4×4 version of ASTC, the smallest block size, takes up 8 bits per pixel, while the 12×12 version takes up only about 1 bit per pixel.

Step 202 includes dividing the ASTC file into a second sub-image that has a second sub-portion of the ASTC file. Dividing the ASTC file into sub-images is accomplished by logically separating the data in the ASTC file into individual segments referred-to as the sub-images. Thus, for example, if the encoded ASTC file is 100×100 pixels, it can be divided into a group of 10 sub-images of 1000 pixels each. The sub-images are defined by blocks of image data. Thus, each sub-image may be deemed a block of data within the overall digital image file or the ASTC file.

In other words, rather than encoding specific portions of the bitmap file into the ASTC format, the one or more embodiments encode the entire bitmap file and then perform sub-division in the ASTC space. The result is that fewer encoding operations are need when rendering is desirable from an ASTC file rather than the bitmap file, thereby dramatically increasing the speed of rendering and improving the computer's ability to render dynamic images quickly, relative to encoding sub-images upon demand.

As indicated above, the sub-images are composed of blocks. A block is a basic data unit in the ASTC file. A block is 128 bits, in one example. Typically a block can contain 100 pixels in a 10×10 array. Thus, for example, the encoded ASTC file with 10,000 pixels in a 100×100 array can be divided into 10 sub-images of 1000 pixels each, with each sub-image composed of 10 blocks having 100 pixels in a 10×10 array.

Step 204 includes copying an ASTC block to a computer memory. The data structure resulting from step 202 (i.e., the sub-divided ASTC file) has known block sizes (i.e., known bit widths of each block). As a result, a fast bitcopy operation can be performed when rendering from an ASTC sub-image, as opposed to encoding data directly from a sub-portion of the original bitmap file. Because fewer processing resources are used to copy and render the ASTC block, as opposed to encoding a bitmap block to ASTC format and rendering the encoded ASTC block, the speed of the rendering process is dramatically increased. In this manner, the one or more embodiments may improve the computer as a tool for rendering images.

In one or more embodiments, copying can include copying the ASTC block into a contiguous portion of the computer memory. By using a contiguous portion of the computer memory the speed of rendering can be further increased as the processing resources used on accessing data in non-contiguous memory sections is saved.

Step 206 includes associating an ASTC header with the sub-image in the computer memory. An ASTC header is a set of data that defines certain properties of the ASTC file (the new ASTC file in this case), such as the dimensions and size of the file, as well as an identifier. The ASTC header is "associated" with the block by associating the header information with the raw data included in the corresponding block. As used herein, the terms "associating" or "associate" mean establishing or having an established logical connection between data sets. In many cases, the header and the associated raw data are in the same portion of contiguous memory, with the header accessed first during processing.

Step 208 includes storing a combination of the ASTC header and the sub-image in the computer memory as a new ASTC file. Storage may be in a non-transitory computer readable storage medium for later use, or in a transitory memory for concurrent use by the computer.

In either case, the original ASTC file that had been encoded from the original bitmap file can now be treated as many new, different, and smaller ASTC files. Thus, when only a portion of the image is to be rendered, then the new smaller ASTC file corresponding to the portion is accessed, copied to a processor (e.g., a graphics processing unit), and rendered.

Attention is now turned to FIG. 2B. FIG. 2B is an extension of the method of FIG. 2A with respect to generating a second new ASTC file.

Step 2B02 includes dividing the ASTC file into a second sub-image that has a second sub-portion of the ASTC file.

Step 2B02 is accomplished in a manner similar to that described with respect to step 202 of FIG. 2A; however, the step is accomplished using a one or more different blocks from the original ASTC file. In an embodiment, the second sub-image may share one or more blocks in common with the first sub-image generated at step 202 of FIG. 2A.

Step 2B04 includes copying the second sub-image to the computer memory. Step 2B04 may be accomplished in a manner similar to step 204 of FIG. 2A. Copying the second sub-image may be performed concurrently or separately with copying the first sub-image at step 204 of FIG. 2A.

Step 2B06 includes attaching a second ASTC header to the second ASTC block. Step 2B04 may be accomplished in a manner similar to step 206 in FIG. 2A.

Step 2B06 includes associating a second ASTC header to the second sub-image. Step 2B06 may be accomplished in a manner similar to step 206 in FIG. 2A. The combination of step 2B06 and step 206 of FIG. 2A may be performed consecutively or concurrently.

Step 2B08 includes storing a second combination of the second ASTC header and the second sub-image in the computer memory as a second new ASTC file. Step 2B08 may be performed in a manner similar to step 208 in FIG. 2A. Step 2B08 and step 208 of FIG. 2A may be performed consecutively or concurrently.

Figure 2C:
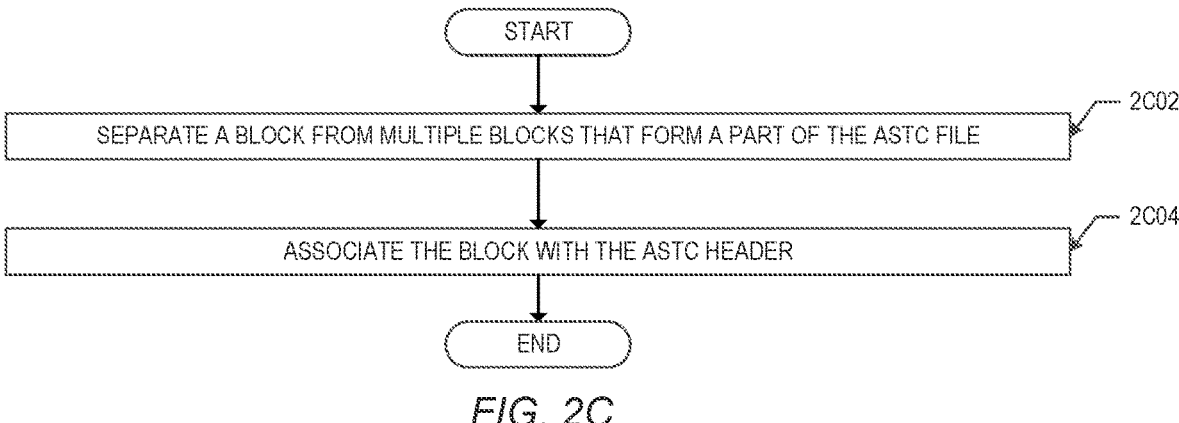

Attention is now turned to FIG. 2C. FIG. 2C is an extension of the method of FIG. 2A.

Step 2C02 includes separating a block from multiple blocks that form a part of the ASTC file. The block is a sub-portion of digital image data contained in the ASTC file. Separating the block is a method for dividing the ASTC file (see step 202 of FIG. 2A).

Step 2C04 includes associating the block with the ASTC header. Step 2C04 is a method of associating the ASTC header with the sub-image (see step 206 of FIG. 2A).

Figure 2D:
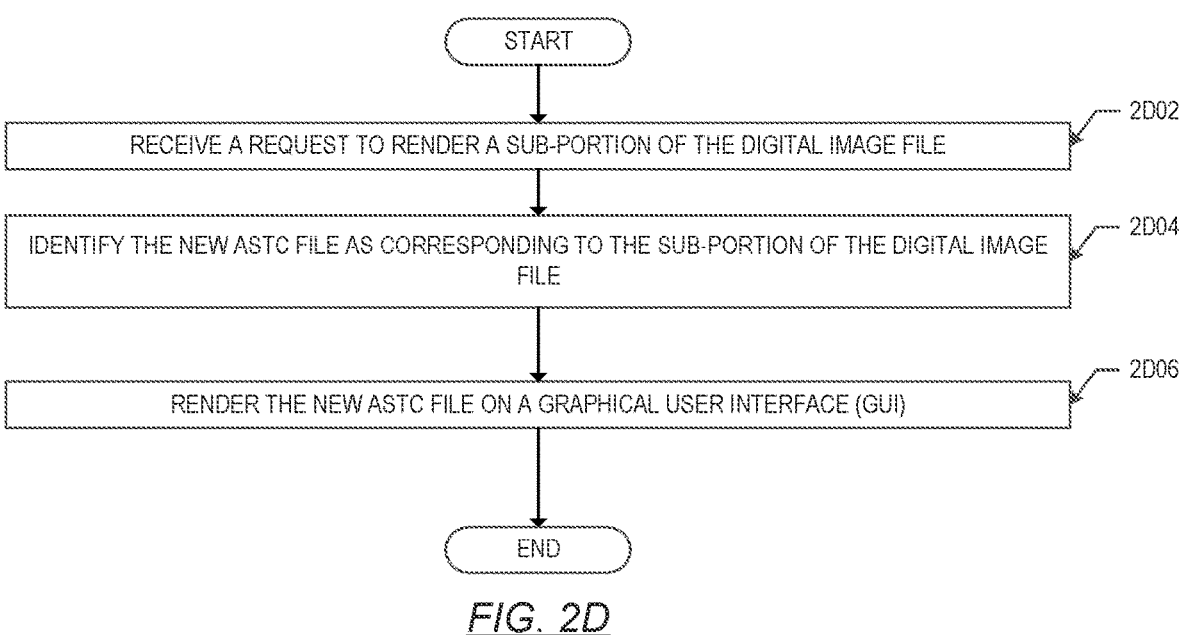

Attention is now turned to FIG. 2D. The method of FIG. 2D is a method of rendering an image on a display device using the ASTC file stored as a result of performing the method of FIG. 2A.

Step 2D02 includes receiving a request to render a sub-portion of the digital image file. The request may come in the form of a command issued by a user to view the sub-portion or data associated with the sub-portion of data. For example, the user might submit a request to see a section of rendered weather images in greater detail. The request may also come in the form of another automated program that requests the rendering as part of the other automated program's programming.

Step 2D04 includes identifying the new ASTC file as corresponding to the sub-portion of the digital image file. Using identifiers, the sub-portion of the image in question is associated with the new ASTC file (i.e., the smaller ASTC file subdivided from the larger ASTC file is identified as corresponding to the sub-portion of the digital image file).

Step 2D06 includes rendering the new ASTC file on a graphical user interface (GUI). Thus, the smaller ASTC file subdivided from the larger ASTC file is used as input during a rendering process. The information in the smaller ASTC file is then displayed graphically on the display device.

Figures 2E, 2F:
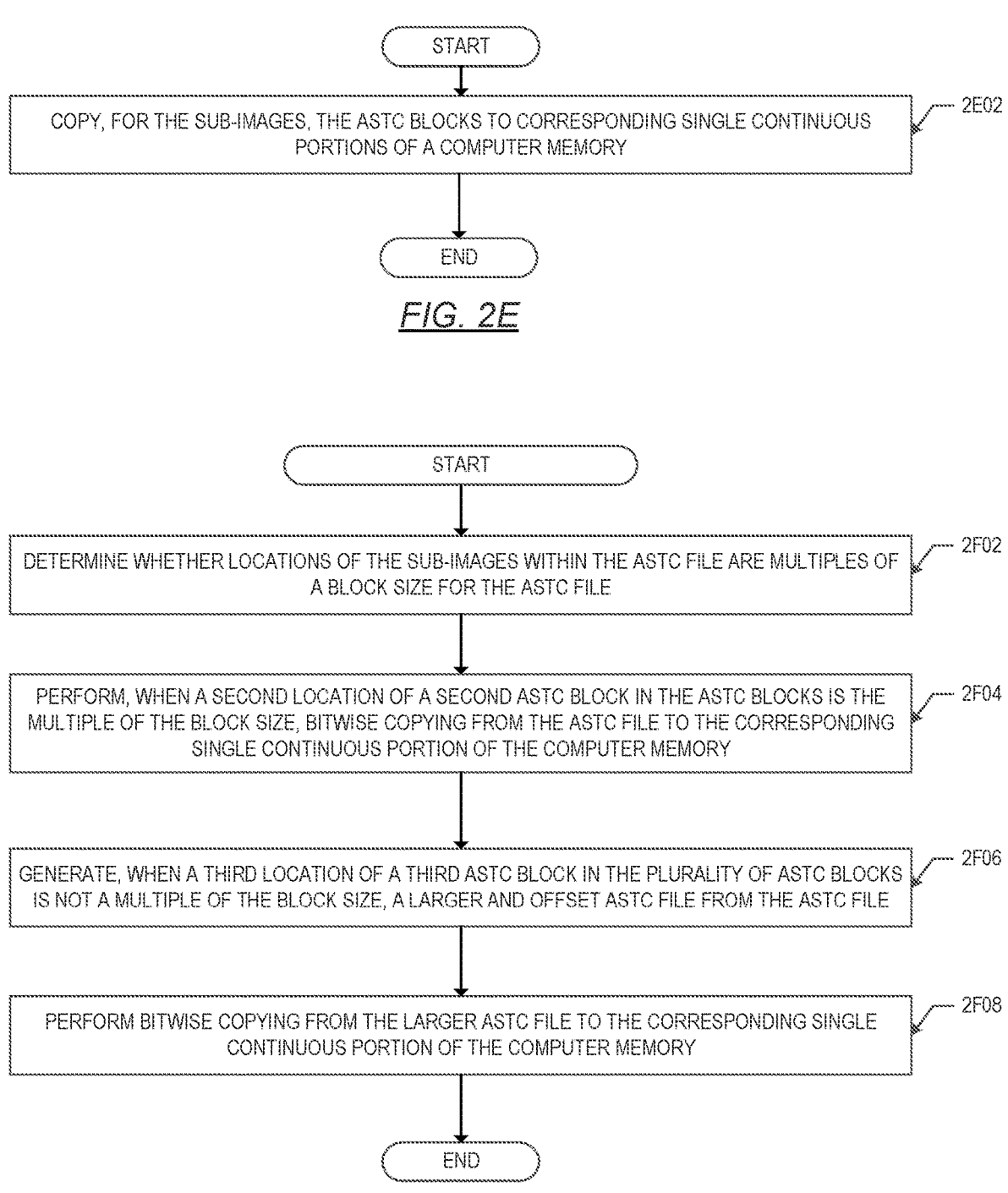

FIG. 2E is a variation of step 204 in FIG. 2A. In particular, step 2E02 includes, copying, for the sub-images, the ASTC blocks to corresponding single continuous portions of a computer memory. The use of a single continuous portion of computer memory can increase the efficiency of rendering the multiple ASTC blocks.

FIG. 2F is another extension to the method shown in FIG. 2A. Step 2F02 includes determining whether locations of the sub-images within the ASTC file are multiples of a block size for the ASTC file. The ASTC file has a defined block size for the ASTC blocks, such as for example 10×10 bits or 5×5 bits. The locations of the sub-images within the ASTC file may or may not be multiples of the defined block size.

Step 2F04 includes performing, when a second location of a second ASTC block in the ASTC blocks is the multiple of the block size, bitwise copying from the ASTC file to the corresponding single continuous portion of the computer memory. In other words, when the ASTC block is a multiple of the block size, the ASTC block is copied to the single continuous portion of computer memory for further processing.

However, step 2F06 includes generating, when a third location of a third ASTC block in the ASTC blocks is not a multiple of the block size, a larger and offset ASTC file from the ASTC file. The larger and offset ASTC file is offset by an amount that places the third ASTC block at a new location within the larger and offset ASTC file that is the multiple of the block size. In other words, the entire ASTC file size is adjusted so that the location of the ASTC block in question becomes a multiple of the block size.

Step 2F08 includes performing bitwise copying from the larger and offset ASTC file to the corresponding single continuous portion of the computer memory. Step 2F08 is performed subsequently to performing step 2F06, as the copying from the adjusted ASTC file is more efficient or results in more efficient subsequent processing by more efficiently distributing the data in the computer's memory.

A specific example of the method of FIG. 2F, in the context of FIG. 2A, is now described. Initially, the original bit map is available and has a dimension of "w×h". Second, the entire bitmap, or a portion thereof, is encoded to an initial ASTC file using a desired block size, defined as "bw×bh".

Third, sub-images are cut from the initial ASTC file according to the following procedure. Each sub-image is defined by a location "x" and "y" in a two-dimensional array, and having a size defined by "w" and "h" identified above. Each sub-image has one or more ASTC blocks of size 128 bits. For each sub-image, copy the ASTC blocks that fall within the sub-image to a continuous block in memory. If the x, y location of a block is a multiple of the block size, "bw×bh", then the copy can be obtained directly from the initial ASTC file. However, if the x, y location is not a multiple of the block size "bw×bh", then a new and offset larger (relative to the initial ASTC file) ASTC file is generated.

The new larger and offset ASTC file is also offset relative to the initial ASTC file. Offsetting is performed so that the number of pixels to offset depends on the location of the desired sub-image. For example, if the sub-image origin is at "6, 5" and the block size is "5×5", then the left-most column of the sub-image would be the second column of the second block. The new "master" ASTC file for this case is encoded with a 4-pixel offset to the right, appending 4 columns of black pixels to the left. The new offset master ASTC file is then cached to be rapidly accessed if needed again. To be specific, the new larger and offset ASTC file is offset from the initial ASTC file horizontally by Wb−Xi % Wb pixels, where Wb is the block width and Xi is the sub-image x location and vertically by Hb−Yi % Hb pixels, where Hb is the block height and Yi is the sub-image y location.

The offset sub-ASTC files are not smaller than the original ASTC file. The offset ASTC files might have different horizontal and vertical offsets, depending on the block size and sub-image location, as seen in the above equation.

The new larger and offset ASTC file is cached for rapid access later. At this point, the copy can be obtained directly from the original, or the new larger and offset ASTC file, as described above, had the x, y location been a multiple of the block size or not.

Fourth, a relevant ASTC header (of size 16 bytes) is attached before that continuous block in memory. The result is a valid ASTC file that has been formed from the individual block that had been copied into contiguous memory.

To summarize by way of example, assume a PNG file of dimensions W×H. The one or more embodiments encode the PNG to an ASTC file using a block size BW×BH. The newly encoded ASTC file contains a header (16 bytes) followed by 16-byte long ASTC blocks (the number of which depends on W, H, BW and BH). The one or more embodiments extract any desired sub-image to a new ASTC file solely using bitwise copy operations. If the desired sub-image location is divisible by the block size, the one or more embodiments can copy the blocks that lie within the desired sub-image to the new ASTC file. If the desired sub-image location is not divisible by the block size, the one or more embodiments generate an offset ASTC file from which the bitwise copy operation is performed. An ASTC header (16 bytes) is attached to the beginning of the sub-image to form a new stand-alone ASTC file.

Attention is now turned to FIG. 3A through FIG. 3C. FIG. 3A through FIG. 3C show methods of rendering an image. The methods of FIG. 3A through FIG. 3C may be implemented using the system of FIG. 1, and may be supported by the methods of FIG. 2A through FIG. 2F.

Step 300 includes receiving a command to render a sub-section of a digital image displayed on a graphical user interface (GUI) from a digital image file. For example, a user may input that the user wishes to see additional detail in a section of a weather map, terrain map, oil field, etc.

Step 302 includes determining, from among stored sub-images of an adaptable scalable texture compression (ASTC) file, a first sub-image that corresponds to the sub-section of the digital image. The ASTC file is a single file encoded from the digital image file. The stored sub-images are stored as additional ASTC files. The determination is made by comparing a location of the sub-section of the digital image to an associated sub-image and/or block in the ASTC file.

Step 304 includes rendering the first sub-image on the GUI. Rendering is accomplished by copying the sub-image, or a block in the sub-image, to a processor (e.g. a graphical processing unit) and executing a rendering algorithm on the data in the sub-image (or block).

FIG. 3B is a variation of rendering at step 304 of FIG. 3A. Step 3B02 includes rendering the digital image on the GUI. The rendering of the digital image may be performed by rendering the original bitmap file or by rendering the ASTC file encoded from the original bitmap file.

Step 3B04 includes rendering the first sub-image on the GUI as an overlay on the digital image. In other words, at step 304 of FIG. 3A, the rendered sub-image is rendered as an overlay on the digital image. Thus, for example, a user may select a sub-section of a weather map, and the computer will display additional graphical information about that sub-section over the main image, to the side of the main image, on top of the main image, etc.

Attention is now turned to FIG. 3C. FIG. 3C is a pre-processing method relative to the method shown in FIG. 3A.

Step 3C02 includes encoding the digital image file into an ASTC file, which is a single file. Step 3C02 is similar to step 200 in FIG. 2A.

Step 3C04 includes dividing, logically, the single file into stored sub-images. Step 3C04 is similar to step 202 of FIG. 2A. However, in the example of FIG. 3, the single ASTC file is subdivided into multiple stores sub-images, such as for example sub-image A (124) and 16 in FIG. 1.

Step 3C06 includes copying the stored sub-images into a computer memory. Step 3C06 is similar to step 204 in FIG. 2A.

Step 3C08 includes creating new ASTC files by associating ASTC headers with the stored sub-images in the computer memory. A one-to-one mapping exists between the plurality of ASTC headers and the plurality of stored sub-images. Step 3C08 is similar to step 206 in FIG. 2A.

Step 3C10 includes storing the new ASTC files as the additional ASTC files. Step 3C10 is similar to step 208 in FIG. 2A in that the new ASTC files are stored as combinations of the ASTC headers and the sub-images in the computer memory.

The method of FIG. 3A through FIG. 3C may be further extended. For example, either method may include pre-processing steps reflected in FIG. 2A.

Thus, while the various steps in the flowcharts are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

Figure 4:
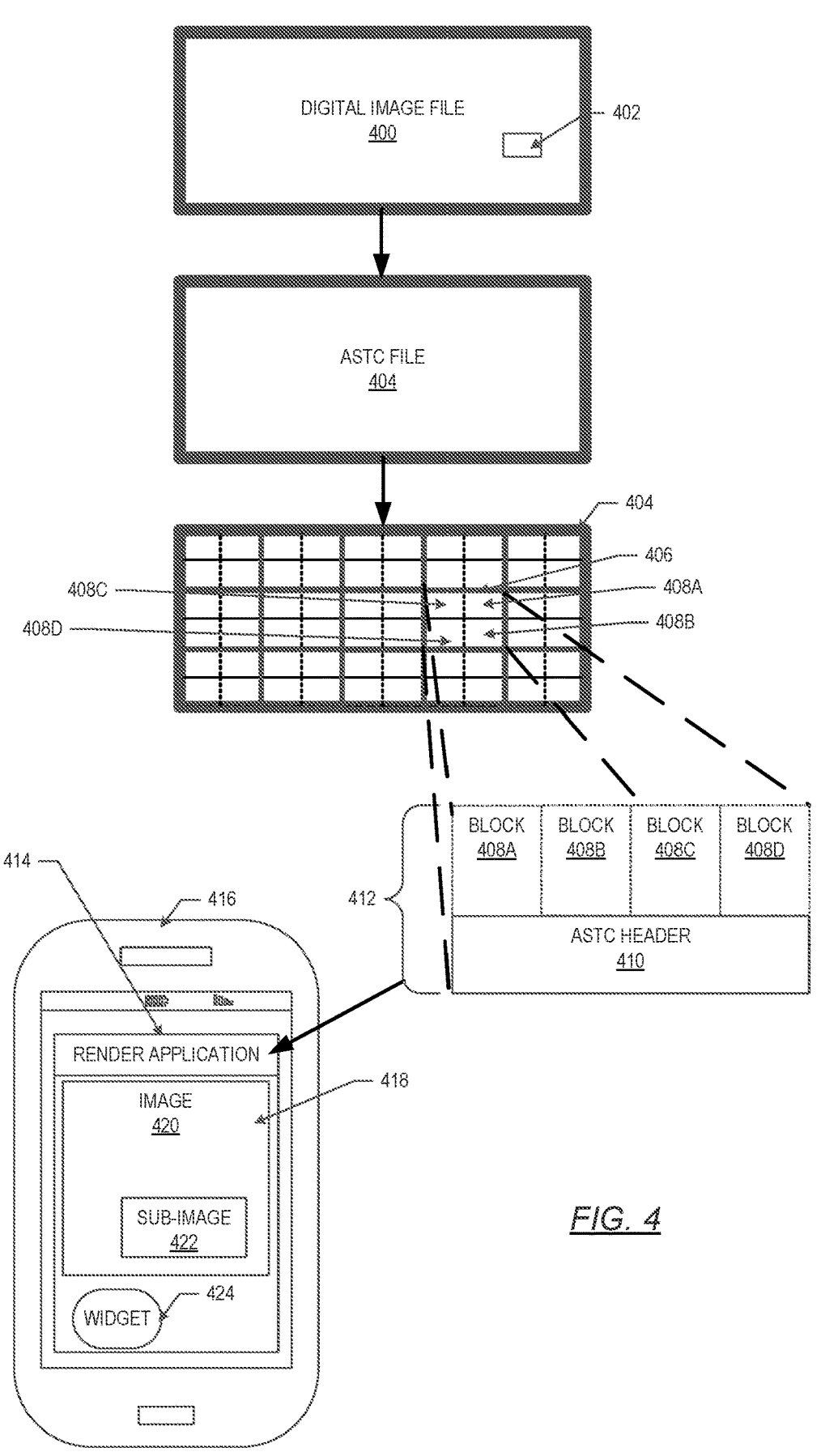
FIG. 4 shows an example of rendering a digital image file, in accordance with one or more embodiments.

FIG. 4 presents a specific example of the techniques described above with respect to FIG. 1 through FIG. 3C. The following example is for explanatory purposes only and not intended to limit the scope of the one or more embodiments. The example of FIG. 4 may be accomplished using the system of FIG. 1 and the methods of FIG. 2A through FIG. 3C.

Initially, a digital image file (400) is available. The digital image file (400) is renderable by a render algorithm to create an image or video on a display screen of a computer. However, the digital image file (400) is not in the ASTC format. The digital image file (400) has a sub-section (402) which contains data of interest, and which is renderable to display a specific sub-section of the image or video.

Initially, the entire digital image file (400) is encoded as an ASTC file (404). In an embodiment, depending on the digital image file (400), less than all of the digital image file (400) could be encoded as the ASTC file (404). For example, in some cases, some or all of the header information in the digital image file (400) might not need to be encoded in the ASTC format. In another example, it may be determined that certain portions of the digital image file (400) are not needed and thus do not need to be encoded into the ASTC file (404).

Next, the ASTC file (404) is sub-divided into a series of sub-images, such as sub-image (406). The process of sub-dividing is described with respect to FIG. 2A through FIG. 2F. As shown in FIG. 1, each sub-image is defined as one or more blocks of data in the ASTC file (404). In the example of FIG. 4, the sub-image (406) is composed of four blocks: block A (408A), block B (408B), block C (408C), and block D (408D).

While the ASTC file (404) shown in FIG. 4 is divided into sub-images composed four blocks each, the one or more embodiments contemplate that sub-images may have different numbers of blocks. Thus, in some embodiments, different sub-images could have one block, two blocks, three blocks, or more than four blocks.

Each of the sub-images are associated with ASTC headers. Thus, for example, the sub-image (406) is associated with ASTC header (410). In particular, the ASTC header (410) is associated with the block A (408A), the block B (408B), the block C (408C), and the block D (408D). Together, the ASTC header (410) and the four blocks (408A) through (408D) form a new ASTC file (412). The new ASTC file (412) may also be considered as being the sub-image (406) associated with the ASTC header (410) (because the sub-image (406) is composed of the four blocks (408A) through (408D)).

In the example of FIG. 4, a request is received to render additional detail regarding the sub-section (402) of the digital image file (400). Location identifiers in the digital image file (400) and the ASTC file (404) are used to identify that the sub-section (402) of the digital image file (400) corresponds to the sub-image (406) of the ASTC file (404).

A render application (414) of a computing device (416) is instructed to retrieve or receive the new ASTC file (412), and then render the new ASTC file (412) on a display device (418) of the computing device (416). The display device (418) already shows an image (420) rendered from the digital image file (400) (or from the ASTC file (404)). A new image, in particular the sub-image (422) shown in FIG. 4, is rendered over the image (420). The new image in the sub-image (422) is rendered from the new ASTC file (412).

A user may use a widget (424) to interact with the image (420), the sub-image (422), the render application (414), or other aspects of the computing device (416). Thus, for example, the user could request rendering of a different sub-area of the image (420). In this case, a still different new ASTC file from the ASTC file (404) can be identified, retrieved, and rendered in an efficient manner without having to retrieve, encode, and then render the sub-section (402) of the digital image file (400).

Figure 5A:
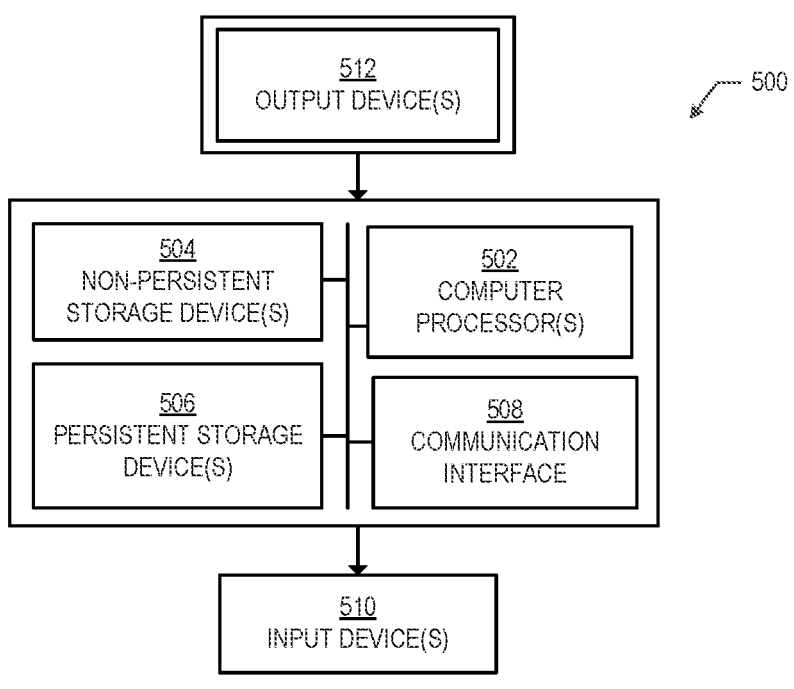
FIG. 5A and FIG. 5B show a computing system and network environment, in accordance with one or more embodiments.
Figure 5B:
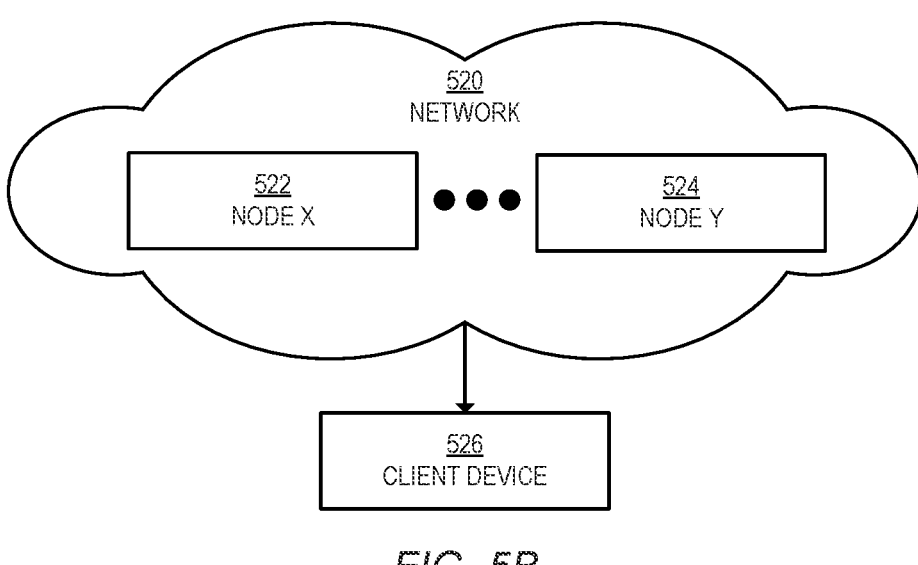

FIG. 5A and FIG. 5B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage device(s) (504) (e.g., volatile-image memory, such as random access memory (RAM), cache memory), persistent storage device(s) (506) (e.g., a hard disk, an optical drive such as a compact disk (CD) drive or digital versatile-image disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (508) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (512), such as a screen (e.g., a liquid crystal display (LCD), a plasma display, a touchscreen, a cathode ray tube (CRT) monitor, a projector, or other display device), a printer, an external storage, or any other output device. One or more of the output device(s) (512) may be the same or different from the input device(s) (510). The input and output device(s) (510 and 512) may be locally or remotely connected to the computer processor(s) (502), the non-persistent storage device(s) (504), and the persistent storage device(s) (506). Many different types of computing systems exist, and the aforementioned input and output device(s) (510 and 512) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of the one or more embodiments.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (500) of FIG. 5A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Further-more, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:

encoding a digital image file corresponding to a digital image into an adaptable scalable texture compression (ASTC) file comprising a single file of compressed digital image data corresponding to the digital image;

dividing, logically, the ASTC file to generate a plurality of sub-images of the digital image, each sub-image of the plurality of sub-images corresponding to a different sub-portion of compressed digital image data of the ASTC file, wherein each sub-portion of compressed digital image data includes at least a plurality of blocks, wherein each block has a same block size comprising a same number of bits;

for each sub-image of the plurality of sub-images, determining whether a compressed digital image data size of the sub-image is a multiple of a block size for the ASTC file;

based on the sub-image having the compressed digital image data size that is the multiple of the block size, bitwise copying the sub-portion of compressed digital image data corresponding to the sub-image from the ASTC file to a corresponding single continuous portion of a computer memory; and based on the sub-image having the compressed digital image data size that is not the multiple of the block size, generating a larger and offset ASTC file for the sub-image from the ASTC file, wherein the larger and offset ASTC file has a compressed digital image data size that is the multiple of the block size and includes the plurality of blocks, and wherein the compressed digital image data size of the larger and offset ASTC file is based on a location of the sub-image relative to the digital image, and bitwise copying the plurality of blocks of the larger and offset ASTC file to a single continuous portion of the computer memory;

associating an ASTC header with the sub-portion of compressed digital image data corresponding to the sub-image in the computer memory; and storing the associated ASTC header before the single continuous portion of the computer memory and storing the sub-portion of compressed digital image data corresponding to the sub-image including at least the plurality of blocks in the single continuous portion of the computer memory as a new ASTC file.

2. The method of claim 1, wherein the digital image file is selected from the group consisting of: a bitmap image (BMP) file, a joint photographic experts group (JPEG) file, a portable network graphics (PNG) file, a tagged image file format (TIFF), a graphics interchange format (GIF) file, a digital negative format (DNG) file, an exchangeable image file format (Exif) file, a WebP file, and a high efficiency image file format (HEIF) file.

3. The method of claim 1, further comprising:

receiving a request to render a sub-section of the digital image file;

identifying the new ASTC file as corresponding to the sub-section of the digital image file; and rendering the new ASTC file on a graphical user interface (GUI).

4. The method of claim 3, further comprising:

rendering the ASTC file of the digital image on the GUI, wherein the new ASTC file is rendered on the GUI as an overlay on the digital image.

5. The method of claim 3, wherein identifying and rendering are performed exclusively on a graphics processing unit (GPU) of a computer generating the GUI.

6. The method of claim 3, wherein the larger and offset ASTC file is offset from the ASTC file horizontally by Wb-Xi % Wb pixels, where Wb is a block width and Xi is a sub-image x location and vertically by Hb-Yi % Hb pixels, where Hb is a block height and Yi is a sub-image y location.

7. The method of claim 3, wherein the ASTC header defines dimensions of the sub-image, a file size, and an identifier.

8. The method of claim 1, wherein the larger and offset ASTC file is offset from the ASTC file horizontally by Wb-Xi % Wb pixels, where Wb is a block width and Xi is a sub-image x location and vertically by Hb-Yi % Hb pixels, where Hb is a block height and Yi is a sub-image y location.

9. The method of claim 1, wherein the ASTC header defines dimensions of the sub-image, a file size, and an identifier.

10. A method comprising:

encoding a digital image file corresponding to a digital image into an adaptable scalable texture compression (ASTC) file comprising a single file of compressed digital image data corresponding to the digital image;

dividing, logically, the ASTC file to generate a plurality of sub-images of the digital image, each sub-image of the plurality of sub-images corresponding to a different sub-portion of compressed digital image data of the ASTC file, wherein each sub-portion of compressed digital image data includes at least a plurality of blocks, wherein each block has a same block size comprising a same number of bits;

for each sub-image of the plurality of sub-images, determining whether a compressed digital image data size of the sub-image is a multiple of a block size for the ASTC file;

based on the sub-image having the compressed digital image data size that is the multiple of the block size, bitwise copying the sub-portion of compressed digital image data corresponding to the sub-image from the ASTC file to a corresponding single continuous portion of a computer memory; and based on the sub-image having the compressed digital image data size that is not the multiple of the block size, generating a larger and offset ASTC file for the sub-image from the ASTC file, wherein the larger and offset ASTC file has a compressed digital image data size that is the multiple of the block size and includes the plurality of blocks, and wherein the compressed digital image data size of the larger and offset ASTC file is based on a location of the sub-image relative to the digital image, and bitwise copying the plurality of blocks of the larger and offset ASTC file to a single continuous portion of the computer memory;

associating an ASTC header with the sub-portion of compressed digital image data corresponding to the sub-image in the computer memory;

storing the associated ASTC header before the single continuous portion of the computer memory and storing the sub-portion of compressed digital image data corresponding to the sub-image including at least the plurality of blocks in the single continuous portion of the computer memory as a new ASTC file;

receiving a command to render a sub-section of the digital image displayed on a graphical user interface (GUI);

determining, from among a plurality of ASTC files stored in memory corresponding to the plurality of sub-images of the digital image, a first ASTC file corresponding to a first sub-image that includes the sub-section of the digital image; and rendering the first sub-image on the GUI using the first ASTC file.

11. The method of claim 10, further comprising:

rendering the digital image on the GUI; and rendering the first sub-image on the GUI as an overlay on the digital image.

12. The method of claim 10, wherein determining and rendering are performed exclusively on a graphics processing unit (GPU) of a computer generating the GUI.

13. The method of claim 10, wherein the digital image is formatted as the digital image file selected from the group consisting of: a bitmap image (BMP) file, a joint photographic experts group (JPEG) file, a portable network graphics (PNG) file, a tagged image file format (TIFF), a graphics interchange format (GIF) file, a digital negative format (DNG) file, an exchangeable image file format (Exif) file, a WebP file, and a high efficiency image file format (HEIF) file.

14. The method of claim 11, wherein the digital image is sub-divided after receiving the command to render the sub-section.

15. A computing system comprising:

a display device;

one or more processing units;

computer memory;

a non-transitory computer readable storage medium in communication with the one or more processing units, wherein the non-transitory computer readable storage medium stores computer readable program code, which when executed, causes the one or more processing units to:

encode a digital image file corresponding to a digital image into an adaptable scalable texture compression (ASTC) file comprising a single file of compressed digital image data corresponding to the digital image;

divide, logically, the ASTC file to generate a plurality of sub-images of the digital image, each sub-image of the plurality of sub-images corresponding to a different sub-portion of compressed digital image data of the ASTC file, wherein each sub-portion of compressed digital image data includes at least a plurality of blocks, wherein each block has a same block size comprising a same number of bits;

for each sub-image of the plurality of sub-images, determine whether a compressed digital image data size of the sub-image is a multiple of a block size for the ASTC file;

based on the sub-image having the compressed digital image data size that is the multiple of the block size, bitwise copy the sub-portion of compressed digital image data corresponding to the sub-image from the ASTC file to a corresponding single continuous portion of the computer memory; and based on the sub-image having the compressed digital image data size that is not the multiple of the block size, generate a larger and offset ASTC file for the sub-image from the ASTC file, wherein the larger and offset ASTC file has a compressed digital image data size that is the multiple of the block size and includes the plurality of blocks, and wherein the compressed digital image data size of the larger and offset ASTC file is based on a location of the sub-image relative to the digital image, and bitwise copy the plurality of blocks of the larger and offset ASTC file to a single continuous portion of the computer memory;

associate an ASTC header with the sub-portion of compressed digital image data corresponding to the sub-image in the computer memory;

store the associated ASTC header before the single continuous portion of the computer memory and storing the sub-portion of compressed digital image data corresponding to the sub-image including at least the plurality of blocks in the single continuous portion of the computer memory as a new ASTC file;

receive a command to render a sub-section of the digital image displayed on a graphical user interface (GUI);

determine, from among a plurality of ASTC files stored in memory corresponding to the plurality of sub-images of the digital image, a first ASTC file corresponding to a first sub-image that includes the sub-section of the digital image; and render the first sub-image on the GUI using the first ASTC file.

16. The computing system of claim 15, wherein the one or more processing units comprises one or more graphics processing units (GPUs), and wherein the computer readable program code for determining and the computer readable program code for rendering are executed on the one or more GPUs.

17. The computing system of claim 15, wherein the digital image is formatted as the digital image file selected from the group consisting of: a bitmap image (BMP) file, a joint photographic experts group (JPEG) file, a portable network graphics (PNG) file, a tagged image file format (TIFF), a graphics interchange format (GIF) file, a digital negative format (DNG) file, an exchangeable image file format (Exif) file, a WebP file, and a high efficiency image file format (HEIF) file.

18. The computing system of claim 15, wherein the computer readable program code is further executable to cause the one or more processing units to:

render the ASTC file of the digital image on the GUI, wherein the first ASTC file of the first sub-image is rendered on the GUI as an overlay on the digital image.

19. The computing system of claim 15, wherein the larger and offset ASTC file is offset from the ASTC file horizontally by Wb-Xi % Wb pixels, where Wb is a block width and Xi is a sub-image x location and vertically by Hb-Yi % Hb pixels, where Hb is a block height and Yi is a sub-image y location.

20. The computing system of claim 15, wherein the ASTC header defines dimensions of the sub-image, a file size, and an identifier.

* * * * *